(12) United States Patent
Ivanovic et al.

(10) Patent No.: US 10,250,909 B1
(45) Date of Patent: Apr. 2, 2019

(54) DEVICE AND METHOD FOR IMPROVING VIDEO CONFERENCE QUALITY

(71) Applicant: ATI Technologies ULC, Markham (CA)

(72) Inventors: Boris Ivanovic, Markham (CA); Allen J. Porter, Markham (CA)

(73) Assignee: ATI Technologies ULC, Markham, Ontario (CA)

(*) Notice: Subject to any disclaimer, the term of this patent is extended or adjusted under 35 U.S.C. 154(b) by 0 days.

(21) Appl. No.: 15/817,732

(22) Filed: Nov. 20, 2017

(51) Int. Cl.
| | |
|---|---|
| *H04N 7/15* | (2006.01) |
| *H04N 19/80* | (2014.01) |
| *H04N 19/87* | (2014.01) |
| *H04N 19/172* | (2014.01) |
| *H04N 19/517* | (2014.01) |

(52) U.S. Cl.
CPC ............ *H04N 19/80* (2014.11); *H04N 7/15* (2013.01); *H04N 19/87* (2014.11); *H04N 19/172* (2014.11); *H04N 19/517* (2014.11)

(58) Field of Classification Search
CPC ........ H04N 7/15; H04N 19/00; H04N 19/147; H04N 19/132; H04N 19/136; H04N 19/85; H04N 19/59

USPC .................................................. 348/1–14.13
See application file for complete search history.

(56) References Cited

U.S. PATENT DOCUMENTS

| | | | | |
|---|---|---|---|---|
| 8,310,595 | B2* | 11/2012 | Buttimer | G09G 5/008 331/20 |
| 2012/0069245 | A1* | 3/2012 | Gandhi | H03L 1/00 348/537 |
| 2014/0064379 | A1* | 3/2014 | Mrak | H04N 19/00775 375/240.18 |

* cited by examiner

*Primary Examiner* — Melur Ramakrishnaiah
(74) *Attorney, Agent, or Firm* — Volpe and Koenig, P.C.

(57) ABSTRACT

A processing device for use with a video conferencing network is provided. The processing device includes memory configured to store data and a processor. The processor is configured to determine a first sampling phase for a portion of first video data and chrominance sub-sample the portion of first video data using the first sampling phase. The processor is also configured to encode the sub-sampled portion of first video data and decode a sub-sampled, encoded portion of second video data. The processor is further configured to determine a second sampling phase at which the portion of second video data is chrominance sub-sampled and chrominance up-sample the portion of second video data using the second sample phase.

20 Claims, 7 Drawing Sheets

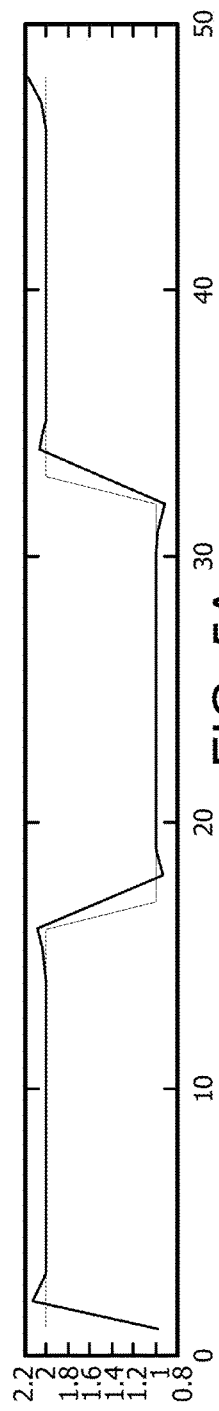
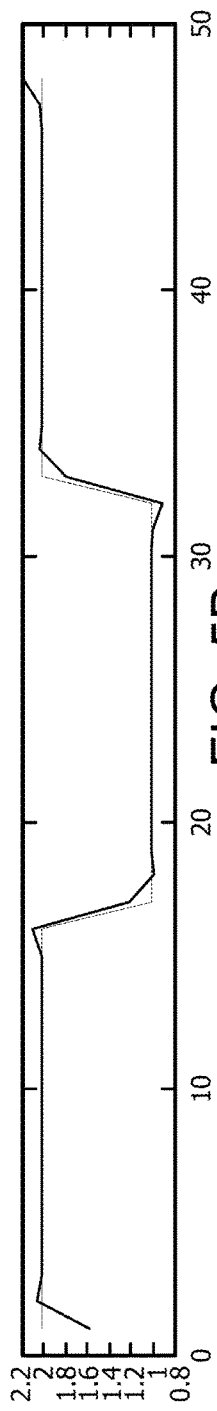
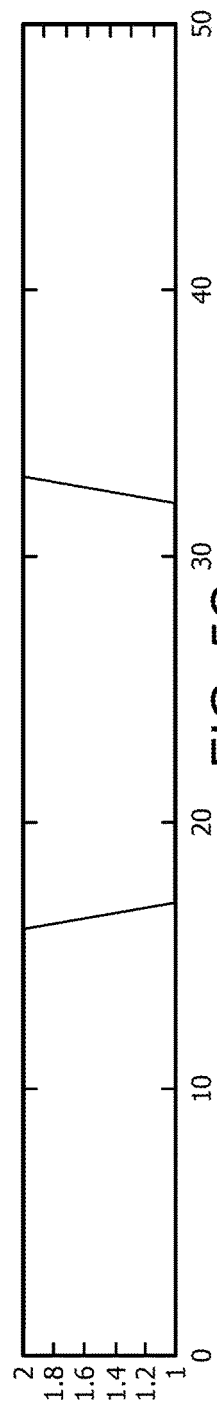
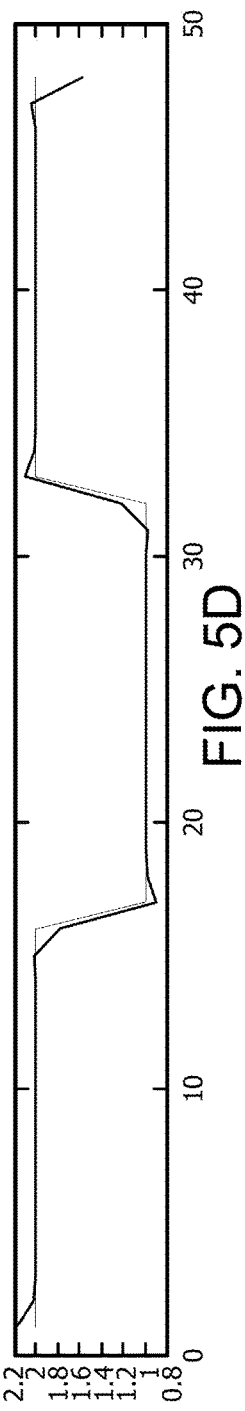
FIG. 5A
FIG. 5B
FIG. 5C
FIG. 5D

DEVICE AND METHOD FOR IMPROVING VIDEO CONFERENCE QUALITY

BACKGROUND

Video codecs, such as H.264 codecs and High Efficiency Video Coding (HEVC) codecs are used to compress the amount of video data (e.g., sequence of frames) transmitted between computing devices (e.g., personal computer, smart phone, tablet and the like). Codecs utilize various compression techniques (e.g., integer transforms, inter-frame prediction and intra-frame prediction) to remove information which is not considered to be critical to the viewing of the video, such as quantization of high frequency information and low pass filtering of the chrominance to a spectrum level less than that of the luminance. The reduced data bandwidth allows more requests to be serviced over established pipelines with lower operator costs.

Some conventional compression techniques compress the video signals using chrominance subsampling. For example, chrominance subsampling is typically used for generalized video encoding in which the chrominance is filtered to a lower spectral level without visual impact degradation. Chrominance subsampling seeks to reduce the data bandwidth while maintaining a level of visual quality (i.e., quality as perceived by a viewer of the displayed video) by utilizing a lower visual sensitivity to color transition than brightness transition by the human vision system. During video conferencing, each video signal (i.e., YCrCb signal) in a video stream is divided into a luminance component Y and two color difference (i.e., chrominance components Cr and Cb). Because the human visual system is more sensitive to variations in brightness than variations in color, chrominance subsampling devotes more bandwidth to the luminance component Y than the chrominance components Cb and Cr in each video signal, thereby decreasing the data bandwidth while maintaining a level of visual quality. The resulting video is commonly described as 4:2:0 (½ by ½) or 4:2:2 (½ by 1).

While these conventional techniques typically work well for video in which the chrominance is heavily filtered, they are less suited for transmitted images having sharp image edges, which occur, for example, during remote video conferencing, where computer generated content (drawings, pdfs, spreadsheets, etc.) is encoded and transmitted. The content, which is natively drawn in a 4:4:4 format (albeit RGB) when created, typically results in sharp visual edges. The sharp edges imply high frequency components, however, which are removed in the color channel via subsampling the chrominance, resulting in color bleeding across edges in the image, creating blurriness and false color artifacts.

BRIEF DESCRIPTION OF THE DRAWINGS

A more detailed understanding can be had from the following description, given by way of example in conjunction with the accompanying drawings wherein:

FIGS. 5A through 5D are graphical illustrations of extracted phase signals used to compose the multiphase signals shown in FIGS. 4A and 4B;

DETAILED DESCRIPTION

Figure 1:
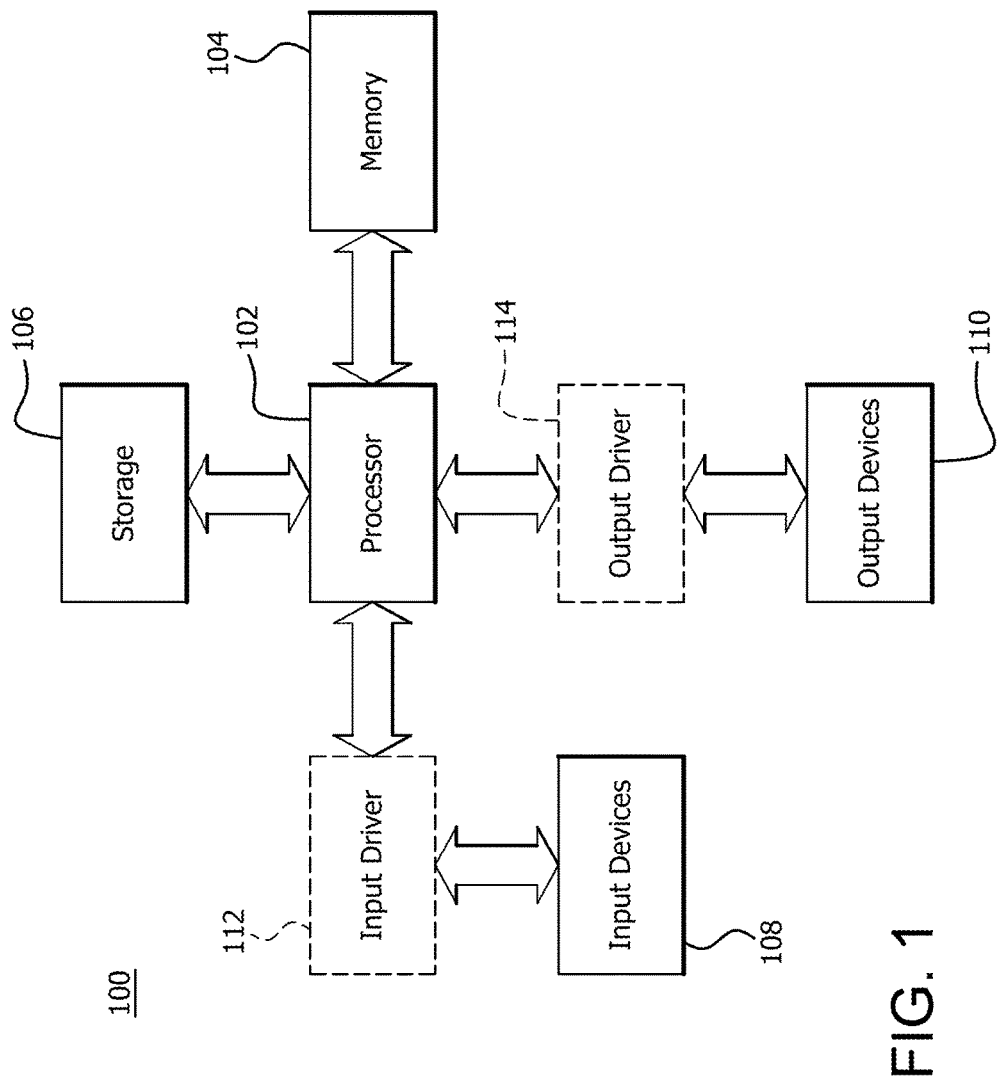
FIG. 1 is a block diagram of an example device in which one or more features of the disclosure can be implemented.

Video codecs operate on a variety of color spaces. For simplification purposes, however, features of the disclosure are described using YCrCb video data. Chrominance signal samples include, for example, 4:4:4 samples, 4:2:0 samples and 4:2:2 samples, where the first number is the sample size and the second number and third numbers define the horizontal and vertical sampling, respectively, relative to the first number. A signal which is not compressed (i.e., not sub-sampled) and maintains the color data is a 4:4:4 sample. A signal which is sub-sampled both vertically and horizontally and maintains ¼ the color data, is a 4:2:0 sample. A signal which is subsampled solely horizontally and maintains ½ the color data, is a 4:2:2 sample. Some video codecs (e.g., professional level equipment), support 4:4:4 and 4:2:2 sampling for higher profiles. Consumer level codecs typically support 4:2:0 sampling, however, to reduce bandwidth more than the codecs which support 4:4:4 and 4:2:2 sampling.

While 4:2:0 sampling works fine for true video content (i.e., native video), standard video codecs are often employed to transmit data which includes not-true video content (e.g., power points, graphics and text). Although chrominance sub-sampling reduces the data bandwidth, the image quality of non-true video content is often more detrimentally affected by chrominance sub-sampling than other video data types. For example, the visual quality of black and white graphics and text are unaffected by color sub-sampling. Typically, the visual quality of colored graphics (e.g., colored object or background) and colored text displayed next to graphics of a different colored is, however, significantly affected by chrominance sub-sampling. In some cases, such as around hard edges, (e.g., when using 4:2:0 data formats as opposed to 4:4:4 data format), the spatial bandwidth used to reproduce these color graphics and text at a level of video quality exceeds the available chrominance sub-sampling bandwidth, resulting in a loss of color edge accuracy which negatively impacts the displayed visual quality. The loss of color edge accuracy typically results from the lost spectral information introduced during the encode/decode process and the sub-sampling/up-scaling process.

Some conventional techniques, such as super resolution techniques, are used to improve the resolution of output video images by relying on sub-pixel motion to collect additional spectral information to add detail and sharpness to the resulting image. When the content exhibits motion, the impact of super resolution techniques often significantly increase the fidelity of the video. When little or no sub-pixel motion is present, however, the characteristics of the signal revert back to the original signal, which offers little help for increasing the fidelity.

The present application provides devices and methods for maintaining image (e.g., graphics and text image) quality similar to that of 4:4:4 sampled images while utilizing pre-existing video conferencing pipelines. Image degradation is reduced when the components (e.g., codecs) at both of the video conference nodes (e.g., participants) support the compression technique. In addition, features described herein provide backward compatibility such that the resulting image quality is not significantly impacted when both ends do not support (e.g., not compatible) the compression technique. Motion in static graphics images (e.g., presentations) displayed during video conferencing is synthesized to transmit additional spectral information to the receiving end, for adding detail and sharpness to the resulting image.

A processing device for use with a video conferencing network is provided which includes memory configured to store data and a processor. The processor is configured to determine a first sampling phase for a portion of first video data and chrominance sub-sample the portion of first video data using the first sampling phase. The processor is also configured to encode the sub-sampled portion of first video data and decode a sub-sampled, encoded portion of second video data. The processor is further configured to determine a second sampling phase at which the portion of second video data is chrominance sub-sampled and chrominance up-sample the portion of second video data using the second sample phase.

A video conferencing subsampling and encoding method is provided which includes receiving a portion of video data and color converting the portion of video data. The method also includes determining, for the portion of video data, a sampling phase from a plurality of sampling phases and chrominance sub-sampling the portion of video data using the determined sample phase. The method further includes encoding the sub-sampled portion of video data.

A video conferencing processing and display method is provided which includes receiving a sub-sampled, encoded portion of video data and decoding the sub-sampled, encoded portion of video data to provide a decoded, sub-sampled portion of video data. The method also includes determining a sampling phase at which the decoded, sub-sampled portion of video data is chrominance sub-sampled and up-sampling the decoded, sub-sampled portion of video data using the sample phase to provide an up-sampled portion of video for display. The method further includes causing the up-sampled portion of video data to be displayed.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also, optionally, includes an input driver 112 and an output driver 114. It is understood that the device 100 optionally includes additional components not shown in FIG. 1.

In various alternatives, the processor 102 includes a central processing unit (CPU), a graphics processing unit (GPU), a CPU and GPU located on the same die, or one or more processor cores, wherein each processor core is, for example, a CPU or a GPU. In various alternatives, the memory 104 is be located on the same die as the processor 102, or is located separately from the processor 102. Processor 102 is configured to execute programmed instructions and cause one or more of the components of each processing device 202 to perform one or more functions, operations, tasks or processes described herein. For example, the processor 102 is configured to render still images, which are used, for example, as input to a video encoder. The still images include, for example, power point slides, graphics images and/or text images using hardware components, software components or a combination of hardware and software components. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, a video camera or a network connection (e.g., a wireless local area network card for transmission and/or reception of wireless IEEE 802 signals). The output devices 110 include, without limitation, a display, a speaker, a printer, a haptic feedback device, one or more lights, an antenna, a network connection (e.g., a wireless local area network card for transmission and/or reception of wireless IEEE 802 signals or other components used to transmit data).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
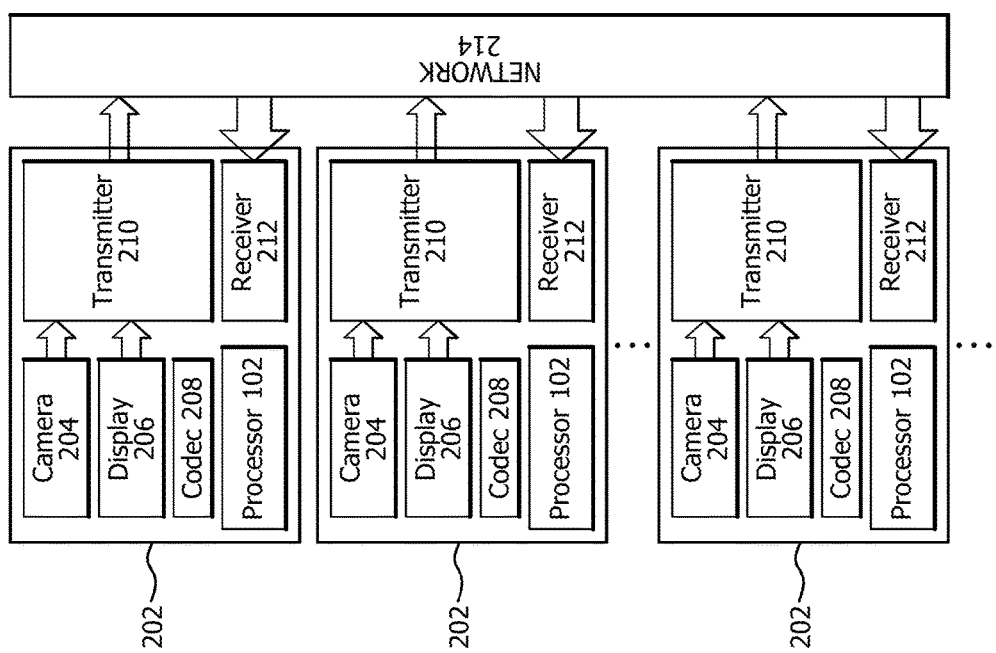
FIG. 2 is a block diagram illustrating an exemplary video conferencing network in which one or more features of the disclosure can be implemented.

FIG. 2 is a block diagram illustrating an exemplary video conferencing network 200 in which one or more features of the disclosure can be implemented. As shown in FIG. 2, the video conference network 200 comprises a plurality of processing devices 202. Each processing device 202 comprises a plurality of components, which include processor 102, camera 204, a display 206, a codec 208, a transmitter 210 and a receiver 212.

Each processing device 202 also comprises, for example, other components not shown in FIG. 2, such as for example, memory 104, a network interface controller (NIC) and other components. Each processing device 202 is configured to receive and transmit (via transmitter 210 and receiver 212) data via network 214. Network 214 includes, for example, one or more networks (e.g., local area network (LAN) or wide area network (WAN)), including wired (e.g., Ethernet) or wireless networks (e.g., via WiFi, Bluetooth, and other wireless standards).

Camera 204 is used to acquire live video (e.g., at a location of one of the processing devices 202) for display on screens of the displays 206 of one or more processing devices 202.

Display 206 includes one or more display screens for displaying video data (e.g., video data acquired by camera 204 and video data displayed on a display of another processing device 202). Types of displays 206 include, for example, a touch screen display such as a display of a tablet or smart phone.

Codec 208 is, for example, embodied in software, hardware, or a combination of hardware and software. Each codec 208 includes a variety of components, such as, for example, an encoder, a decoder, a color converter, a down-sampling filter (e.g., chrominance sub-sampling filter), an up-sampling filter (e.g., chrominance up-sampling filter), a phase shifter, an infinite impulse response (IIR) filter, an analog to digital converter, a digital to analog converter, a multiplexer and a demultiplexer. The components are used to perform a variety of functions including, but not limited to, encoding, decoding, up-sampling, down-sampling, [phase shifting] and converting (e.g., color conversion, analog to digital conversion, digital to analog conversion) a video data stream. Codec 208 is also used for performing additional processing functions, such as for example, motion searching, audio-video (A/V) synchronization of audio data and video data and formatting the video data into packets (e.g., IP packets) for transporting over a network 214.

Transmitter 210 and receiver 212 are illustrated in FIG. 2 as separate components. Alternatively, transmitter 210 and receiver 212 are combined into a single component (e.g., transceiver). Each transmitter 210 transmits encoded video data (e.g., video data acquired by camera 204 and video data displayed on a screen of display 206) to one or more other participating processing devices 202 in the video conference network 200. Each receiver 212 receives the encoded video data from one or more other participating processing devices 202 to be decoded and displayed.

A processing device 202 includes, for example, the same hardware and/or software components (i.e., are compatible) as one or more other processing devices 202. Alternatively, a processing device 202 includes hardware and/or software components that are different from one or more other processing devices. Processing devices 202 described herein are configured to operate with one or more other processing devices 202 having the same components. In addition, processing devices 202 are also configured to operate (i.e., backward compatible) with one or more other processing devices having different hardware and/or software components (e.g., older devices, devices from different manufacturer) without significant image degradation (e.g., not perceptible to a viewer). As described in more detail below, additional information is synthesized into the video signals transmitted between processing devices 202 to provide high video quality regardless of whether different devices include the same hardware and software components or different hardware and/or software components.

During video conferencing, video data is communicated between multiple participating processing devices 202. For example, video (e.g., graphics and text) displayed on a screen (e.g., of display 206) of one of the processing devices 202 is transmitted to one or more of the other processing devices 202 and displayed on the screens (i.e., shared screen) of the other processing devices 202. In some video conferencing sessions, live video is acquired from a camera at processing device and displayed at the processing device. The live video data is also transmitted to one or more other processing devices for display.

Figure 3:
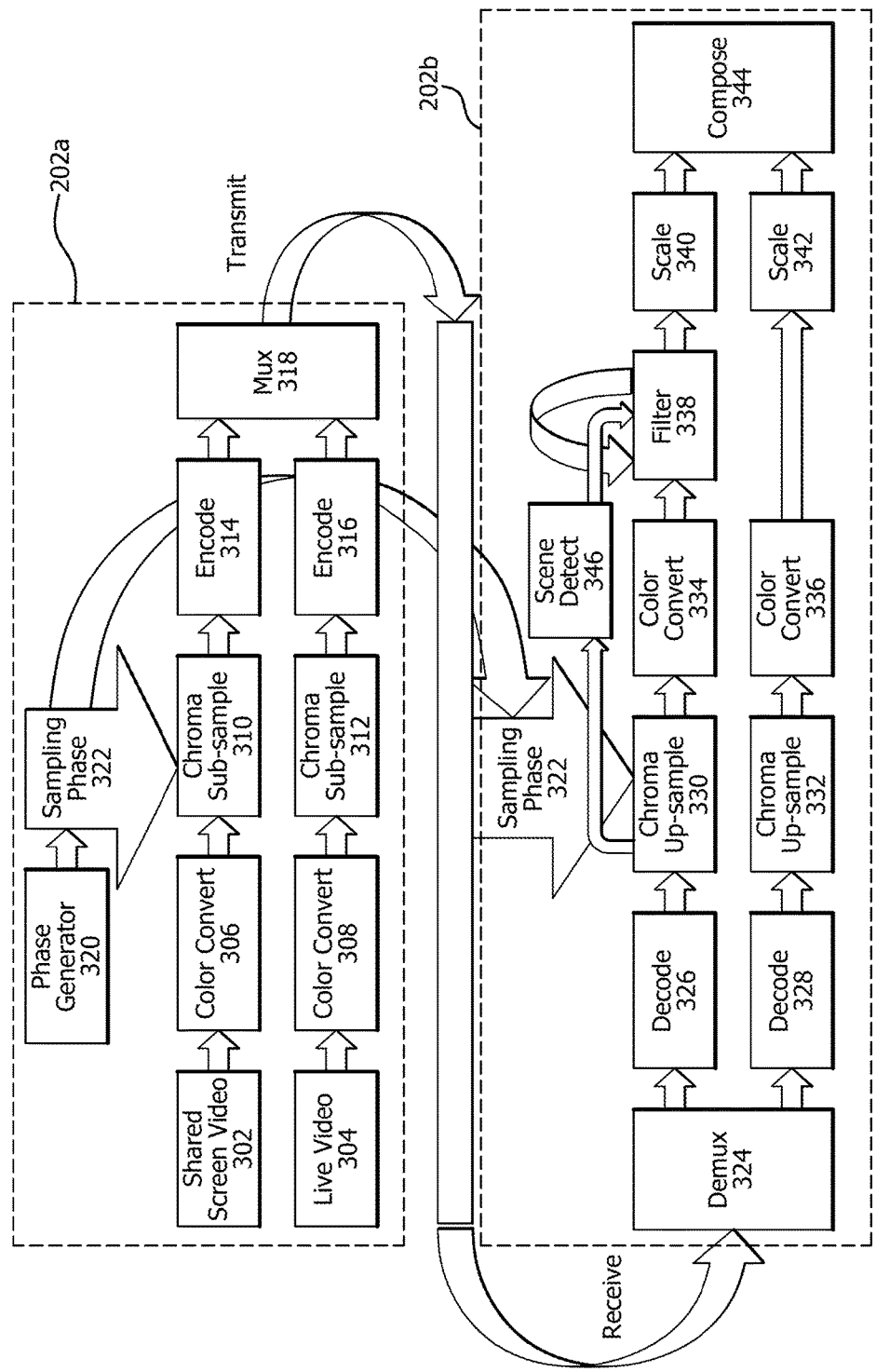
FIG. 3 is a block diagram illustrating an example encoding and decoding process using two of the processing devices of the video conferencing network shown in FIG. 2.

FIG. 3 is a block diagram illustrating an example encoding and decoding process using two of the processing devices 202a and 202b of the video conferencing network 200 shown in FIG. 2. Each of the processing devices 202a and 202b includes, for example, hardware components, software components or a combination of hardware and software components. For simplified explanation purposes, processing device 202a is used to illustrate the generating of an encoded video stream and processing device 202b is used to illustrate the decoding of the video stream that is encoded at processing device 202a. Any of the processing devices 202 shown in FIG. 2, including processing devices 202a and 202b shown in FIG. 3, are configured to generate an encoded video stream as well as decode an encoded video stream. In addition, each processing device 202 is configured to perform the same functions (described in more detail below) as another processing device 202, including selecting a sampling phase from multiple sampling phases, chrominance sub-sampling, encoding, decoding, determining a sampling phase of an encoded stream and chrominance up-sampling.

One or more processors, such as processor 102, are used to implement the processing stages in FIG. 3. As shown in FIG. 3, video data (e.g., static graphics images and text on presentations and whiteboards) displayed on a screen of processing device 202a (to be shared on a screen of processing device 202b) is acquired at block 302 and live video data is acquired from camera 204). The shared screen video data is color converted (e.g., from RGB signal to a YCrCB signal), chrominance sub-sampled and encoded at blocks 306, 310 and 314, respectively. The live video data is also color converted, chrominance sub-sampled and encoded at blocks 308, 312 and 316, respectively. The shared screen video data and the live video data are multiplexed at block 318 and transmitted to processing device 202b.

The encoded video data received at processing device 202b is demultiplexed, at block 324, into the encoded shared screen video data and the encoded live video data. The live video data is decoded, chrominance up-scaled, color converted (e.g., from a YCrCB signal to a RGB signal) and scaled at blocks 328, 332, 336 and 342, respectively. The encoded shared screen video data is decoded at block 326 and chrominance up-scaled at block 330.

As described above, however, color edge accuracy loss typically results from lost spectral information introduced during the encode/decode process as well as during the sub-sample/up-sample process. Artifacts, such as mosquito noise, blocking artifacts and non-smooth (e.g., blurred) edges, are typically addressed by adjusting the compression ratio and/or applying post-processing techniques to reduce the severity of the artifacts and improve the video quality.

The negative impact from other types of artifacts on the visual quality, however, is not easily addressable by compression ratio adjustments and post-processing techniques. For example, some artifacts are caused by the loss of spectral information in the chrominance component of the signal during chrominance sub-sampling and chrominance up-sampling. The lost spectral information is often not reconstructed accurately. These artifacts occur, for example, around sharp edges of graphic objects and text of one color against the background of different color and result in false colors and color bleeding.

The sub-sampling/up-sampling process removes spectral information from the signal to prevent aliasing artifacts (artifacts which effectively create new signals), resulting in corruption of the visual signal. The video signal is filtered prior to sub-sampling by reducing the spectral component (i.e., bandwidth) to a level reproducible by the receiving processing device 202. For example, to down-sample a signal by 2:1, the signal is filtered to ½ the original bandwidth. Band limiting the signal by ½ the bandwidth removes the high frequency components from the original signal. These high frequency components are not recovered when the signal is up-sampled, however, resulting in lower image quality (e.g., less sharp). In addition, the alignment on edges between the chrominance and luminance signals is compromised for chrominance signals, resulting in color bleeding.

To facilitate the recovery of the lost spectral information and better reconstruct the original input signal, sub-pixel motion is artificially created (i.e., synthesized) in the shared screen video. During the sub-sampling process, the phase relationship of the sub-sampling filter and the input signal is varied over time (i.e. frame to frame) as described below with reference to FIG. 3.

As shown in FIG. 3, a phase generator 320 determines a sampling phase 322 for each portion (e.g., frame) of the shared screen video data. The sampling phase 322 for a portion of video data is determined from a plurality of sampling phases (e.g., sampling phases shown in FIGS. 5A though 5D). For example, the sampling phase 322 for a portion of the video data is determined by comparing the results of multiple sampling phases and selecting the sampling phase 322, from one of the sampling phases, based on the compared results. The selection is made, for example, by comparing a previous input signal to a corresponding previously reconstructed signal. That is, the decoded signal results are fed to the encoder for the encoding processing to avoid or limit error propagation. In other words, the encoder predicts against the same data accessible to the decoder. In another example, the sampling phase 322 for a portion of the video data is selected from a plurality of a pre-determined phases. By varying the phase relationship of the sub-sampling filter and the input signal, a different spectral component for each frame is transmitted to processing device 202b.

The select sampling phase 322 includes, for example, one of the varied sampling phases and alternatively, the non-varied sampling phase (i.e., the sample position without varying the phase). A decision to broadcast one of the varied sampling phases or broadcast the non-varied sampling phase to processing device 202b is determined, for example, via logic local to a pixel, a pixel neighborhood or globally. The decision is based on factors, such as for example, when there is motion in an area of portion of the signal samples, when details of the algorithm are not tolerant/motion aware and when it is determined that a better result is achieved without using the sampling phase 322.

The shared screen video data is chrominance sub-sampled at block 310 at the determined sampling phase 322 and encoded at block 314. That is, the chrominance content is phase shifted using the determined sampling phase 322, and decimated 2:1 to create 4:2:0 content. The encoded chrominance content is multiplexed at block 318 and provided, via a network such as network 214 shown in FIG. 2, to processing device 202b.

Processing device 202b receives and decodes the encoded 4:2:0 portion (e.g., frame) of video at block 326 and determines the sampling phase 322 of the encoded portion of the video signal. The sampling phase 322 is determined, for example, by a predetermined pattern. The predetermined pattern includes, for example, a predetermined order of phase offsets dispersed around the co-sited position (e.g., repeating sequence (−0.5−0.5), (0.5, −0.5), (0,0), (−0.5,0.5), (0.5, 0.5)). Alternatively, the sampling phase 322 is determined by an indicator (e.g., metadata, such as a watermark, stenograph or tag) inserted into the signal at processing device 202a, which indicates the determined sampling phase 322. In another example, the sampling phase 322 is determined by analyzing the phase of the luminance data to the chrominance data (e.g., the resulting decoded image is analyzed to determine the phase of the sampled data using statistics).

The chrominance content of the decoded video signal is up-sampled at block 330 using the same sampling phase at which it was sub-sampled. That is, the the portion of video data is chrominance up-sampled at block 330 using the sample phase 322. Processing device 202b maintains a higher resolution version of the incoming video source, at 4:4:4, which encompasses each filter phase position. For example if 4 positions (vertically and horizontally) are selected, a 2:1 size image is produced.

As shown at FIG. 3, the up-sampled portion of video is color converted at block 334 and filtered, (e.g., by an IIR filter) at block 338, such that the video signal is updated by the portion of video data sampled at the determined sample phase 322. The IIR filter is typically biased toward historical samples to extract the extended spectral information from the signal. When a scene change is detected (i.e., a level of change of the characteristics of the video signal such as average pixel level (APL)) at block 346, however, the IIR filter is reset (e.g., triggered by scene detection algorithm) at block 338, reverting to the current sample to minimize the impact to the transitions. The IIR filter is subsequently switched to be biased toward the historical samples. The scene change is detected, for example, by analyzing the APL or monitoring a histogram of the image to detect a level of change.

The scene change detection via an IIR filter is, however, merely exemplary. Other techniques for detection scene changes include for example, detection via motion information and detection by determining scene change probability (as opposed to a binary determination).

The resulting image is scaled (e.g., via a point spread function (PSF)) to the original size of the source image at block 340 and composed for display at block 344.

Figure 4A:
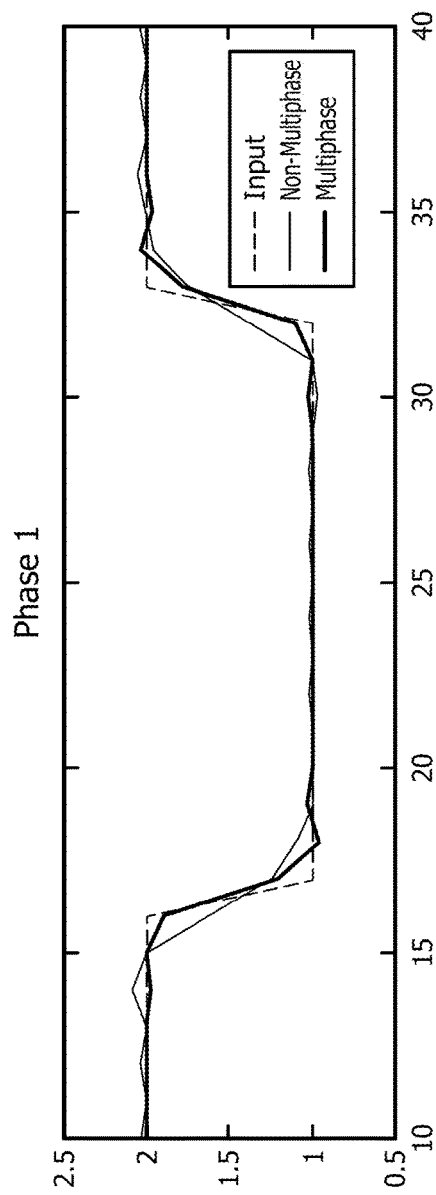
FIG. 4A is a graphical illustration of source data sub-sampled at a first phase position according to the features described herein.
Figure 4B:
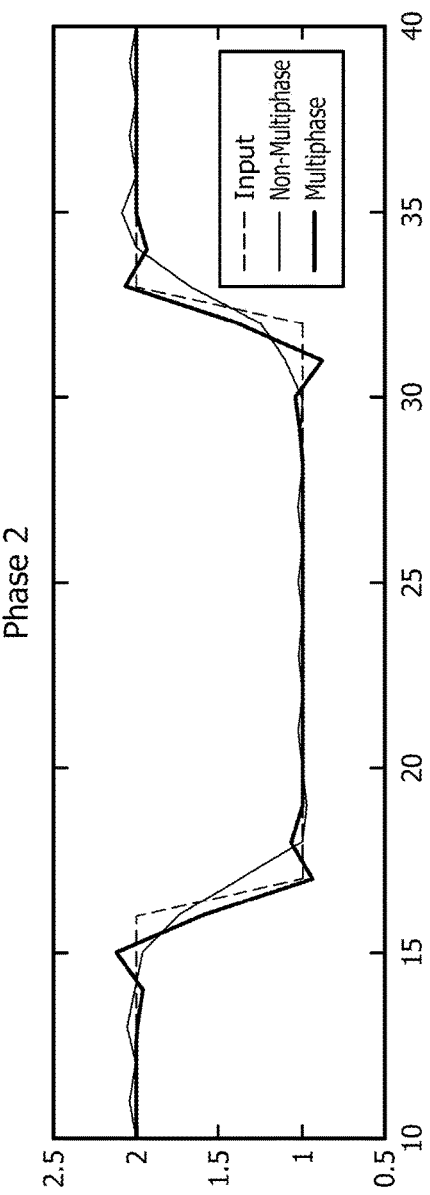
FIG. 4B is a graphical illustration of source data sub-sampled at a second phase position according to the features described herein.

FIGS. 4A and 4B graphically illustrate source data sub-sampled at two different phase positions to the sub-sampling point to show the relative signal change. FIG. 4A is a graphical illustration of source data sub-sampled at a first phase position (Phase 1) and FIG. 4B is a graphical illustration of source data sub-sampled at a second phase position (Phase 2). Each of the graphs in FIGS. 4A and 4B show the source video data (i.e., Input) signal, the signal processed without using multiple phases (i.e., non-multiphase) and the signal processed using multiple phases (i.e., Multiphase) as described herein. The horizontal axis in each of the graphs in FIGS. 4A and 4B indicate the samples and the vertical axis indicate the signal value.

The transition of each signal from the lower portion of the graph to the upper portion of the graph represents edge transition of the image. As shown in FIG. 4, by processing (i.e., subsampling) the signal using multiple phases, the slope of the transition of the Multiphase signal is closer to the slope of the transition of the Input signal than the slope of the transition of the Non-Multiphase signal. A slope which is closer to the transition of the input signal manifests as increased detail and sharpness in a two dimensional (2-D) image with a reduction of color bleeding. Accordingly, as shown in FIGS. 4A and 4B, the 2-D image corresponding to the Multiphase signal is displayed with more detail and sharpness than the 2-D image corresponding to the Non-Multiphase signal.

FIGS. 5A though 5D are graphical illustrations of four extracted phases of a signal used to compose the Multiphase signals shown in FIGS. 4A and 4B. As described above with regard to FIGS. 4A and 4B, the horizontal axis in each of the graphs in FIGS. 5A through 5D indicate the samples and the vertical axis indicate the signal value. Each graph shows a different extracted phase of a video signal. For example, the four extracted sampling phases in the graphs at FIGS. 5A through 5D are compared, as described above, to select sampling phases for composing the Multiphase signals shown in FIGS. 4A and 4B. The number of extracted signal phases shown in FIGS. 5A through 5D are merely exemplary. The number of samples for each signal and the signal values shown in FIGS. 4A, 4B and FIGS. 5A through 5D are also exemplary.

Figure 6:
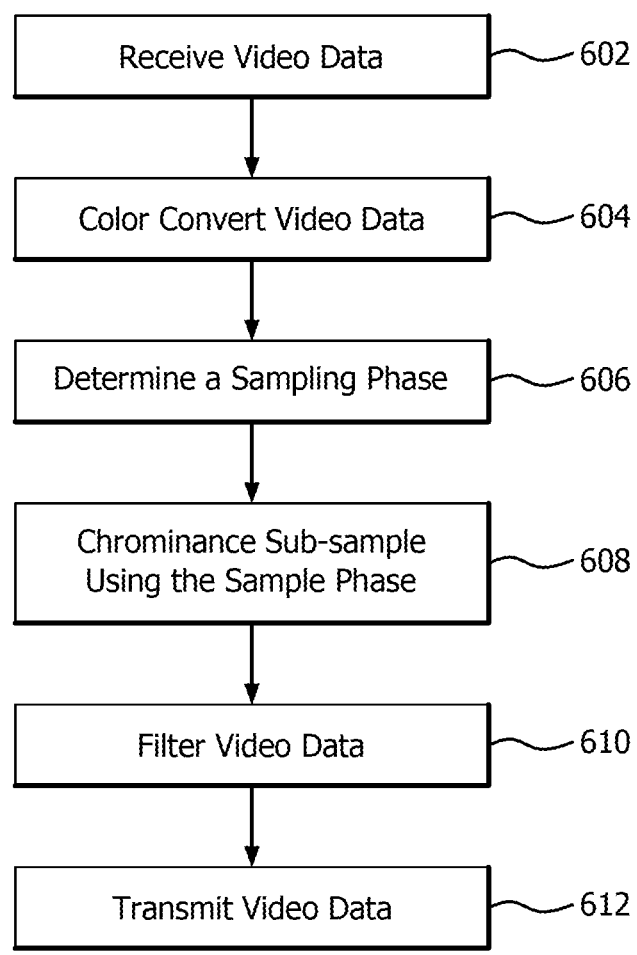
FIG. 6 is a flowchart illustrating an exemplary video conferencing subsampling and encoding method.

FIG. 6 is a flowchart illustrating an exemplary video conferencing subsampling and encoding method 600. The method 600 is implemented, for example, by any of the processing devices 202 shown in FIG. 2. As shown at block 602 in FIG. 6, the method 600 includes receiving a portion of video data. The portion of received video data is received, for example, by a processor of video processing device 202a shown in FIG. 3. The portion of video data corresponds to video, such as shared screen video, which is currently displayed or to be displayed on a screen of processing device 202a and a screen of one or more other processing devices, such as processing device 202b shown in FIG. 3.

As shown at block 604 in FIG. 6, the method 600 includes color converting the portion of video data. For example, the portion of video data is color converted to a YCrCb color space by dividing the portion of video data into a luminance component Y and two color difference (i.e., chrominance components Cr and Cb). The YCrCb color space, used herein to describe one or more features of the disclosure, is merely exemplary.

As shown at block 606 in FIG. 6, the method 600 includes determining a sampling phase for the portion of video data. The sampling phase is determined from a plurality of sampling phases. For example, the sampling phase is determined by comparing the results of multiple sampling phases (e.g., sampling phases shown in FIGS. 5A though 5D) and selecting the sampling phase from one of the sampling phases based on the compared results.

As shown at blocks 608 in FIG. 6, the method 600 includes chrominance sub-sampling the portion of video data using the sample phase determined at block 606 and encoding the sub-sampled portion of video data. The encoded, sub-sampled portion of video data is then filtered (e.g., via an IIR filter) at block 610 and provided (e.g., from video processing device 202a in FIG. 3) via a network (e.g., network 214 in FIG. 2) to one or more other video processing devices (e.g., video processing device 202b in FIG. 3) for display at the one or more other video processing devices.

Figure 7:
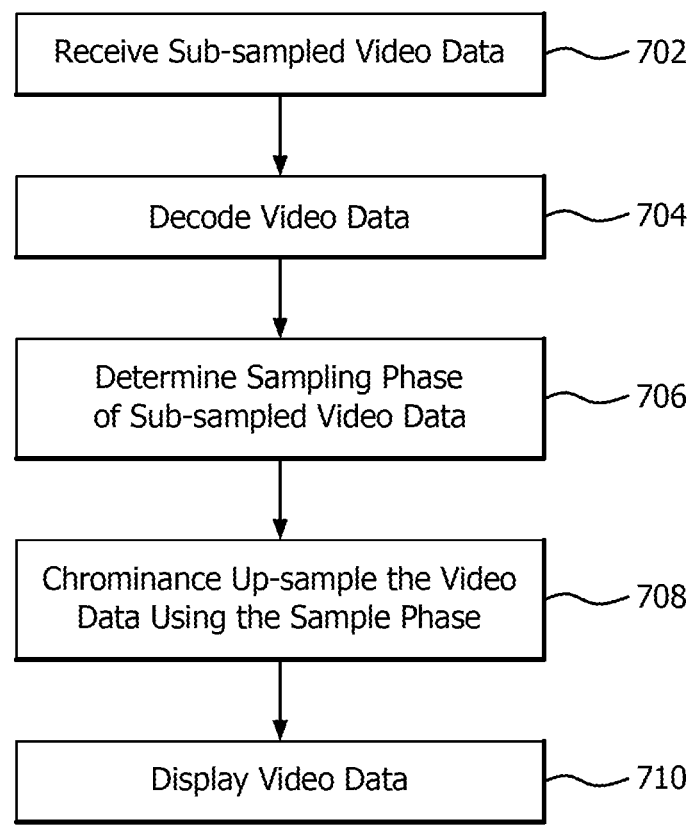
FIG. 7 is a flowchart illustrating an exemplary processing and display method.

FIG. 7 is a flowchart illustrating an exemplary processing and display method 700. The method 700 is implemented, for example, by any of the processing devices 202 shown in FIG. 2. As shown at block 702 in FIG. 7, the method 700 includes receiving a sub-sampled, encoded portion of video data. For example, the sub-sampled, encoded portion of video data is received by processing device 202b shown in FIG. 3. The received video data corresponds to the chrominance sub-sampled, encoded video data provided from processing device 202a shown in FIG. 3.

As shown at block 704 in FIG. 7, the method 700 includes decoding the sub-sampled, encoded portion of video data to provide a decoded, sub-sampled portion of video data. As shown at block 706 in FIG. 7, the method 700 includes determining a sampling phase at which the decoded, sub-sampled portion of video data is chrominance sub-sampled. For example, the sampling phase corresponds to the sampling phase determined at processing device 202a. The sampling phase of the decoded, sub-sampled portion of video data is determined, for example, by a predetermined pattern. Alternatively, the sampling phase is determined by an indicator (e.g., metadata, such as a watermark, stenograph or tag) inserted into the video signal (e.g., inserted by a processor at processing device 202a).

As shown at block 708 in FIG. 7, the method 700 includes chrominance up-sampling the decoded, sub-sampled portion of video data using the determined sample phase. For example, the video data is chrominance up-sampled, via the sample phase used to chrominance sub-sample the video data at processing device 202a, to provide an up-sampled portion of video for display. Prior to display, the up-sampled portion of video is color converted, filtered, (e.g., by an IIR filter) and scaled, as described above with regard to FIG. 3. The video data is then composed for display on a screen of processing device 202b, as shown at block 710. For example, a processor of processing device 202b causes the video data to be displayed on the screen of processing device 202b.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core or a combination of the above. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor that implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device for use with a video conferencing network, the processing device comprising:
    memory configured to store data; and
    a processor configured to:
        determine a first sub-sampling phase for each of a plurality of portions of first video data;
        chrominance sub-sample each of the portions of first video data using the first sub-sampling phase;
        vary, over time, a phase relationship of the chrominance sub-samples and the portions of first video data;
        encode each of the portions of first video data;
        decode sub-sampled, encoded portions of second video data;

determine a second sub-sampling phase at which each of the portions of second video data is chrominance sub-sampled; and chrominance up-sample each of the portions of second video data using the second sub-sample phase.

2. The processing device according to claim 1, further comprising:

a transmitter configured to transmit the portions of first video data to a second processing device; and a receiver configured to receive the portions of second video data from the second processing device.

3. The processing device according to claim 1, wherein the portions of first video data are color converted portions of video data comprising at least one of graphics and text.

4. The processing device according to claim 1, wherein the processor is further configured to determine the first sub-sampling phase by comparing a plurality of sub-sampling phases and selecting one of the plurality of sub-sampling phases as the first sub-sampling phase.

5. The processing device according to claim 4, wherein the processor is further configured to determine the plurality of sub-sampling phases by comparing the portions of first video data to a reconstructed signal.

6. The processing device according to claim 1, wherein the processor is further configured to chrominance sub-sample each of the portions of first video data as one of a 4:2:0 sample portion of video data and a 4:2:2 sample portion of video data.

7. The processing device according to claim 1, wherein the portions of first video data correspond to shared screen video data.

8. The processing device according to claim 1, wherein the processor is configured to determine the second sub-sampling phase, at which the portions of second video data are chrominance sub-sampled, using a predetermined pattern.

9. The processing device according to claim 1, wherein the processor is configured to determine the second sub-sampling phase, at which the portions of second video data are chrominance sub-sampled, from a phase indicator in the portions of second video data.

10. The processing device according to claim 1, wherein the processor is configured to determine the second sub-sampling phase, at which the portions of second video data are chrominance sub-sampled, from a phase of luminance to chrominance data.

11. The processing device according to claim 1, wherein the processor is further configured to chrominance up-sample each of the portions of second video data as a 4:4:4 sample portion of video data and update the 4:4:4 sample portion of video data according to the second sub-sampling phase using an impulse response filter.

12. The processing device according to claim 11, wherein the processor is further configured to reset the impulse response filter by using scene detection.

13. A video conferencing subsampling and encoding method, comprising:

receiving a plurality of portions of video data;

color converting the portions of video data;

determining, for each of the plurality of portions of video data, a sub-sampling phase from a plurality of sub-sampling phases;

chrominance sub-sampling each of the plurality of portions of video data using the sub-sampling phase;

varying, over time, a phase relationship of the chrominance sub-samples and the portions of portions of video data; and encoding each of the plurality of portions of video data.

14. The method according to claim 13, wherein determining the sub-sampling phase further comprises comparing the plurality of sub-sampling phases and selecting one of the plurality of sub-sampling phases as the sub-sampling phase.

15. The method according to claim 14, further comprising determining the plurality of sub-sampling phases from a pre-determined sequence.

16. The method according to claim 14, further comprising determining the plurality of sub-sampling phases by comparing the portion of video data to a reconstructed signal.

17. A video conferencing processing and display method, comprising:

receiving chrominance sub-sampled, encoded portions of video data, each having a different spectral component caused by a varied phase relationship, over time, between the chrominance sub-sampled, encoded portions of video data and corresponding portions of first video data;

decoding the sub-sampled, encoded portions of video data to provide decoded, sub-sampled portions of video data;

determining sampling phases at which the decoded, sub-sampled portions of video data are chrominance sub-sampled;

chrominance up-sampling the decoded, sub-sampled portions of video data using the sample phases to provide up-sampled portions of video for display; and causing the up-sampled portions of video data to be displayed.

18. The method according to claim 17, further comprising determining the sampling phases using predetermined patterns.

19. The method according to claim 17, further comprising determining the sampling phases from a phase indicators in the chrominance sub-sampled, encoded portions of video data.

20. The method according to claim 17, further comprising chrominance up-sampling each of the decoded, sub-sampled portions of video data as a 4:4:4 sample portion of video data and updating the 4:4:4 sample portion of video data according to one of the sampling phases using an impulse response filter.

* * * * *